ABSTRACT
United States Patent [19]

Higgs et al.

[11] Patent Number: 4,585,273
[45] Date of Patent: Apr. 29, 1986

[54] VEHICLE SEAT

[75] Inventors: Derek J. Higgs, Eastwood; Russell G. Murty, Billericay; Alan Robins, Chelmsford, all of United Kingdom

[73] Assignee: Hawtal Whiting Design & Engineering Co., Ltd. of Pembroke House, Pilsen, England

[21] Appl. No.: 517,667

[22] Filed: Jul. 27, 1983

[30] Foreign Application Priority Data

Sep. 2, 1982 [GB] United Kingdom ............... 8225012

[51] Int. Cl.$^4$ .................................................. A47C 7/02
[52] U.S. Cl. .................................... 297/452; 297/468
[58] Field of Search ............ 297/216, 361, 375, 468, 297/473, 470, 452, 482; 280/801; 248/393, 429

[56] References Cited

U.S. PATENT DOCUMENTS

| | | | |
|---|---|---|---|
| 1,571,509 | 2/1926 | Connolly | 297/375 |
| 2,572,149 | 10/1951 | Hind et al. | 297/361 X |
| 3,463,543 | 8/1969 | Zellar | 297/216 |
| 3,727,977 | 4/1973 | Gmeiner | 297/468 X |
| 4,133,556 | 1/1979 | Glinski | 280/801 |
| 4,262,963 | 4/1981 | Bauer et al. | 297/473 |

FOREIGN PATENT DOCUMENTS

| | | | |
|---|---|---|---|
| 2820589 | 11/1979 | Fed. Rep. of Germany | 297/473 |
| 2408360 | 7/1979 | France | 280/801 |

Primary Examiner—William E. Lyddane
Assistant Examiner—José V. Chen
Attorney, Agent, or Firm—Thomas R. Vigil

[57] ABSTRACT

In order to provide a vehicle seat frame which gives a designer great freedom, a seat frame is formed of a moulded body or a foam, such as polyurethane, reinforced internally by a fabricated sheet metal skeleton.

The frame is covered by a pad to complete the seat.

The seat back 6 and seat pan 5 portions of the frame are structurally independent.

Seat belt anchorages (18, 18a, 21) are mounted on the seat back frame portion rather than to the vehicle body, and the arrangement is such that the restraint loads do not pass through the seat pan portion 5 of the frame.

7 Claims, 5 Drawing Figures

VEHICLE SEAT

This invention relates to vehicle seats.

While the seat specifically to be described is primarily for passenger cars, it will be appreciated that the invention is also applicable to seats for other vehicles such as vans, lorries, trucks, tram cars and trolley buses and also to aircraft, ground effect vehicles (hovercraft), waterborne craft and space travelling vehicles.

Most vehicle seats are built on substantial steel frame constructions. The seat back frame is often pivotally mounted on the seat frame and the latter is anchored to the floor via a sliding pivot. It is also normal practice for seat belts to be anchored to the vehicle body and floor, and also to provide an anchored socket in the floor for receiving a catch, sliding or adjustable, on the belt.

It has now been discovered that if a vehicle seat frame is made from a moulded, preferably reaction injection moulded, foam plastics material, preferably a polyurethane, reinforced internally with a fabricated sheet metal skeleton, then the instructural strength of the frame can be higher for a given weight than a conventional tubular structure, and also, the designer has a greater degree of freedom in obtaining greatest efficacy in providing strength at the required points.

Accordingly, the present invention consists primarily in a vehicle seat frame or a vehicle seat having a seat frame comprising a seat back frame portion and a seat pan frame portion, which portions are structurally separate, at least one of the said frame portions being made from moulded foamed plastics material reinforced by an internal skeleton of fabricated sheet metal, in which the seat back portion of the frame includes seat belt anchorage points and is mountable so as to transmit restraint loads to the vehicle body without transmitting them through the seat pan frame portion.

It is a particularly advantageous feature of the invention that the seat back portion of the frame carries the anchorages for a seat belt in the passenger restraint system. This anchoring of the seat belt to the seat back frame has several advantages including: correct positioning of the anchorages whatever the seat adjustment; leaving access to the rear passenger compartment unimpeded in two door vehicles; simplicity of body design; and also enabling seat belts to be used in vehicles without adequately strong pillars, e.g. convertibles, plastics bodied vehicles, and buses, and in seats, such as centre seats, which are remote from a door pillar.

The structurally separate seat back portion and seat pan portion are preferably independently mounted on a sliding mechanism comprising a platform, the lateral edges of which are received on slides positioned on either side of the seat.

The restraint loads are thus transmitted to the sliding mechanism and from there to the vehicle body. The sliding mechanism may be attached to slides which are mounted on vertically and horizontally extending panels so as to be in shear for maximum strength when the restraint loads are applied.

The seat back and seat pan portions of the frame may be separately adjustable on the single sliding mechanism.

The invention will be further described with reference to the accompanying diagrammatic drawings, wherein.

Figure 1:
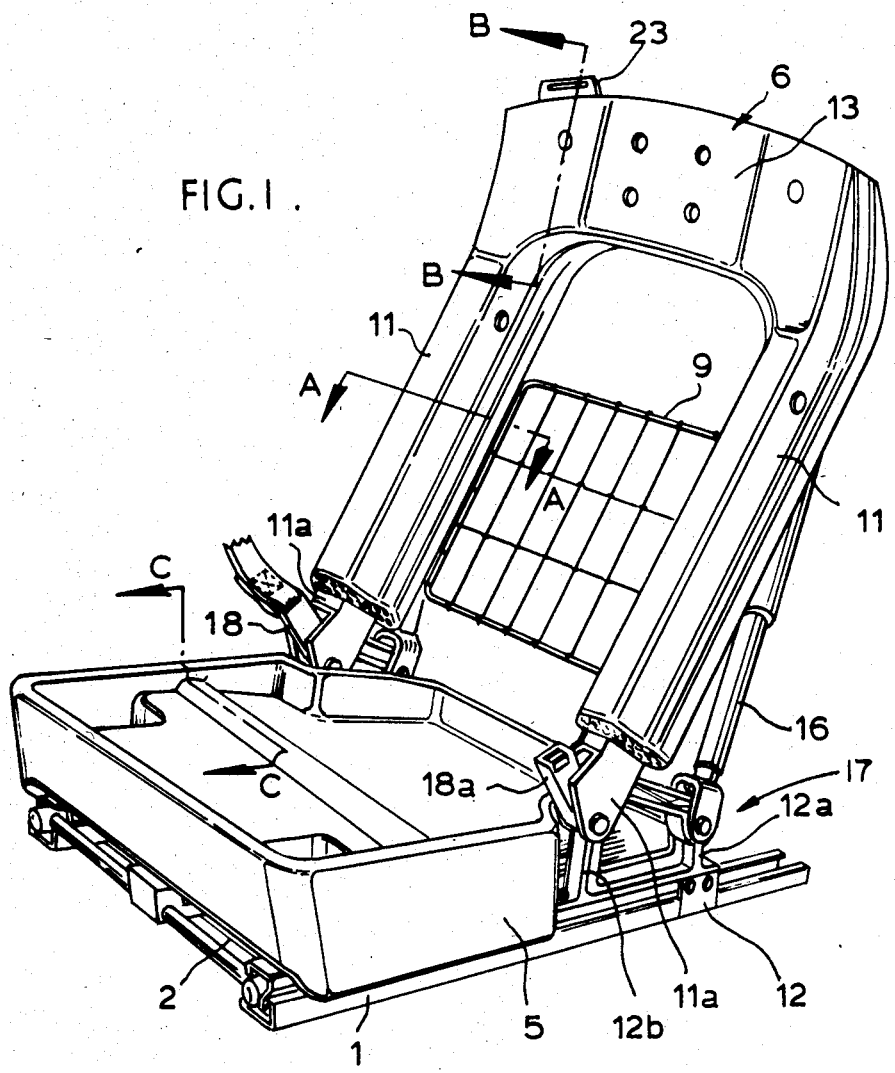
FIG. 1 is a perspective view of a seat frame in accordance with a form of the invention.
Figure 3:
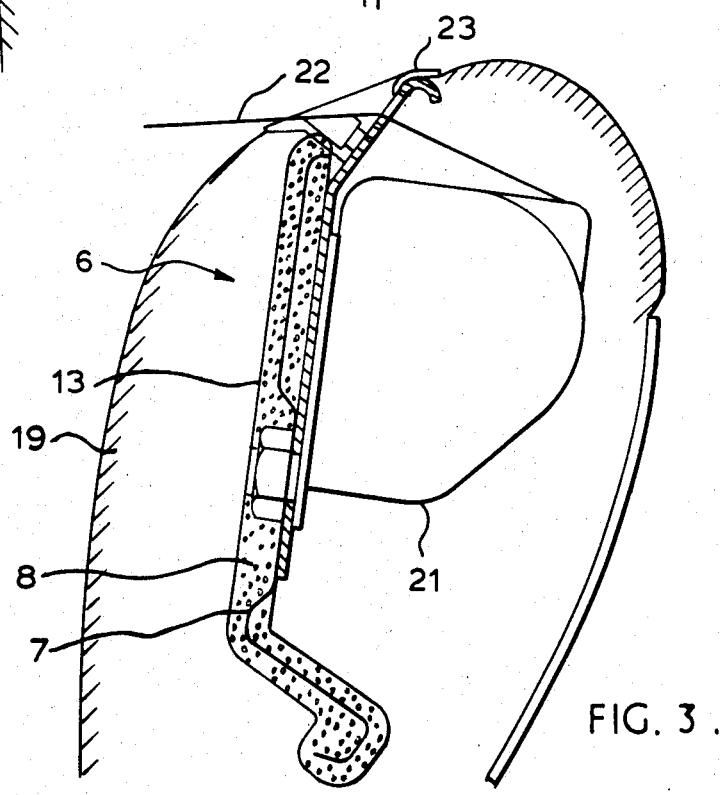
FIG. 3 is an enlarged section taken on the line B—B of FIG. 1, showing part of a seat back pad with a seat belt reel.
Figure 4:
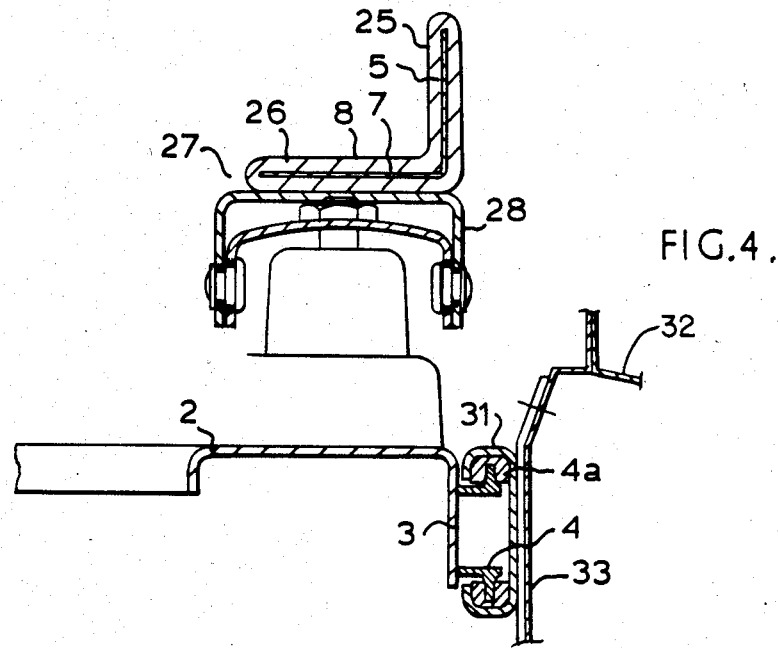
FIG. 4 is an enlarged section taken on the line C—C of FIG. 1 incorporating details of mounting to vehicle panels.
Figure 5:
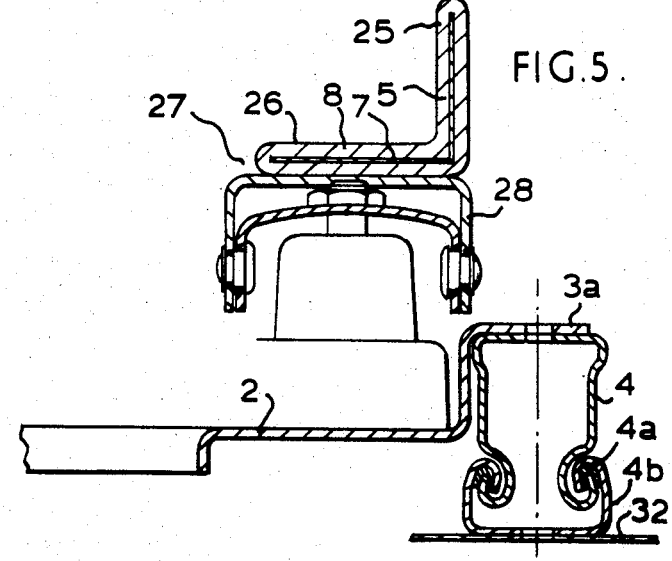
FIG. 5 is an alternative to section C—C in FIG. 4, also being part of a seat cushion.

Turning first to FIG. 1, there is shown a sliding mechanism generally indicated by the reference numeral 1, and also shown in FIG. 4. This mechanism has a horizontal support surface 2 (see FIGS. 4 and 5) and may have horizontal or vertical side surfaces 3 or 3a (FIGS. 4 and 5) which carry fore/aft adjusters 4 (FIG. 5) with sliding bearings 4a (FIG. 5). The support surface 2 carries a seat pan frame portion generally indicated by numeral 5 and a seat back frame portion generally indicated by reference numeral 6. Each of the frame portions 5 and 6 is made from reaction injection moulded polyurethane which reinforced by a fabricated skeleton of sheet steel, and in FIGS. 2, 3, 4 and 5, a part of the skeleton is indicated by 7, and the surrounding polyurethane foam material by 8.

The seat back frame portion 6 has an inverted U-shape and comprises a pair of upright side members 11 each having a reinforced extension 11a pivoted to a bracket 12 on the support surface 2. The side members 11 are joined by an integral upper cross member 13. The side members 11 also support a flexilator 9 to carry a seat back cushion. An aperture is left in the rigid foam at the rear of each side member to house at each side a strut 16 of variable effective length pivoted at its upper end to the seat back frame and at its lower end, as shown at 17, to a bracket 12a and thence to the sliding mechanism 1.

The variable effective length of the struts 16 is provided to adjust the inclination of the seat back frame portion 6, and is preferably achieved by means of the strut being formed of two end sections threadedly connected to a tubular centre section which is rotatable by a suitable electrically driven worm drive (not shown) so as to draw the end sections together or push them apart as appropriate.

It will be seen that by drawing the end sections together, the seat back frame portion 6 will be tilted progressively further back, even as far as a full reclining position and the reverse motion will move the frame portion 6 towards the upright position.

In order to provide for a free tilt forward, the seat back frame portion 6 may be releasable from the struts 16 by the provision of a latching mechanism (not shown) which is normally engaged but which may be manually released when it is required to tilt the seat forward, e.g. to allow access to a rear passenger compartment in a two door vehicle.

Figure 2:
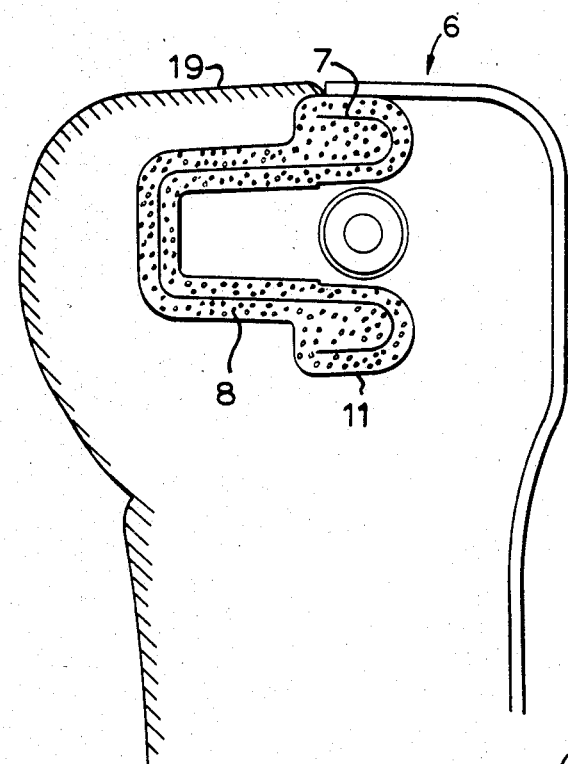
FIG. 2 is an enlarged section taken on the line A—A of FIG. 1, showing part of a seat back pad.

FIG. 2 shows in outline the position of a foam pad 19 to complete the seat back, and further parts of the outline of the pad 19 can also be seen in FIG. 3.

FIG. 3 shows the cross member 13 of the seat back frame, and illustrates how a reel 21 for a shoulder harness seat belt 22 is attached to the cross member 13 by bolting through to the steel skeleton 7. The reel is entirely enclosed by the seat back pad 19, and the belt 22 is shown as passing out through a suitable protective sleeve 23.

The pad 19 will normally be covered by a seat covering of self-retaining form so that maximum serviceability can be obtained.

FIG. 1 further shows how a lap seat belt anchorage 18 for one end of the belt is provided at the base of one of the side frame members 11 and a latch mechanism 18a to receive a clasp belt is provided on the base of the other side frame member 11. Normally, the seat belt anchorages are provided on the outboard side of a vehicle and the latch on the inboard side of the seat but this is dictated by the necessity for providing the reel anchorages for the shoulder harness belt 22 on the vehicle body. However, now that the reel anchorage are mounted on the seat back frame portion, this design constraint goes and it is possible to provide the reverse arrangement so that the latch is on the outboard or door side of the seat. This simplifies the provision of so called passive restraint systems in which the seat belt is latched when the passenger enters, and in particular, use may be made of the opening of the door to pull the seat belt clear of the driver or passenger, and its closure to latch the passenger in.

It is also possible within the scope of the invention to provide an additional forward extension on the side frame member 11 having the latch so that the occupant of the seat is restrained from being thrown against the door or across the car in the direction when not restraint adequately by the belt passing diagonally across the chest.

It can be seen from FIG. 4 that the seat pan frame portion 5 consists of a vertical flange 25 and a horizontal flange 26 leaving an open area 27 within the frame. The flanges 26 are mounted, as illustrated, on adjustment mechanisms 28, the details of which are not illustrated. This enables the frame portion 5 to move in a fore and aft direction relative to the slide 1, and may also allow a degree of tilt, quite independently of the adjustment of the seat back frame portion 6.

FIG. 4 also shows the sliding flange assembly 4 in association with a slide assembly 31 fixed adjacent a vehicle floor panel 32 but actually secured to a generally vertical panel 33 so that the restraint forces are absorbed in a shear mode. In a conventional passenger car, the tunnel and rocker panels are appropriate for mounting such slide assemblies 31.

It will be appreciated that the seat frame portion 5 and cushion (not shown), by nature of its independence from its seat back frame, will be bypassed by the majority of restraint loads. These loads will instead be taken by the seat back frame and directed through the pivot brackets and lower slides only so as to be dissipated into the floor, rocker tunnel and associate reinforcements.

Turning now to FIG. 5, this shows in outline a pad 24 forming a seat cushion and this may be attached to the seat pan frame portion 5 in any suitable manner in order to avoid possible unacceptably high restraint torques arising in the FIG. 4 mode of connecting. An alternative is shown in FIG. 5, in that the support surface 2 is downwardly dished and has lateral horizontal extensions 3a carrying slides 4 with bearings 4a running in slideways 4b The slideways are mounted on floor panel 32.

It will be appreciated that an additional advantage of using moulded polyurethane as the frame is that no finishing or surface protection is necessary, as is required with the conventional steel frames, so that a certain amount of cost is saved in this direction.

Various modifications may be made within the scope of the invention. For example, the feature of reclinability may be omitted.

We claim:

1. In a vehicle seat frame comprising a seat back frame portion and a seat pan frame portion, the improvement residing in that the said seat back frame portion and the said seat pan frame portion are structurally separate, that at least one of said frame portions is moulded from foamed plastics material which is reinforced by an internal skeleton of fabricated sheet metal, and that the seat back frame portion mounts a source for each of at least two seat belts, includes seat belt anchorage points, and is mountable so as to transmit restraint loads from the sources and anchorage points for the seat belts to the vehicle body without transmitting them through the seat pan frame portion.

2. A seat frame as claimed in claim 1, in which the plastics material is polyurethane.

3. A seat frame as claimed in claim 2 in which the plastics material is moulded by reaction injection moulding.

4. In a vehicle seat including a vehicle seat frame comprising a seat back frame portion and a seat pan frame portion, the improvement residing in that the said seat back frame portion and the said seat pan frame portion are structurally separate, that at least one of the said frame portions is moulded from foamed plastics material which is reinforced by an internal skeleton of fabricated sheet metal, and in that the seat back frame portion includes shoulder harness and lap seat belt anchorage points and is mountable so as to transmit restraint loads from the anchorage points to the vehicle body without transmitting them through the seat pan frame portion.

5. A vehicle seat as claimed in claim 4, including a seat back pad of foam material, in which the anchorage position for the shoulder harness seat belt are enclosed within the foam material of the seat back frame pad.

6. A vehicle seat as claimed in claim 4 in which further anchorage positions are at one side of the seat and a belt latch is mounted on the seat back portion on the other side, and in which the other side of the seat has a restraint extending forwardly of the seat back frame portion and located above the belt latch.

7. In a vehicle seat frame comprising a seat back frame portion and a seat pan frame portion, the improvement residing in that the said seat back frame portion and the said seat pan frame portion are structurally separate, that at least one of said frame portions is moulded from foamed plastics material which is reinforced by an internal skeleton of fabricated sheet metal, and that the seat back frame portion mounts a source for seat belt means, includes anchorage points for the seat belt means, and is mountable so as to transmit restraint loads from the source and anchorage points for the seat belt means to the vehicle body without transmitting them through the seat pan frame portion.

* * * * *

UNITED STATES PATENT AND TRADEMARK OFFICE
CERTIFICATE OF CORRECTION

PATENT NO.  : 4,585,273
DATED       : April 29, 1986
INVENTOR(S) : Derek J. Higgs, et al It is certified that error appears in the above-identified patent and that said Letters Patent is hereby corrected as shown below:

Column 1, line 22, "instructural" should be --structural--
Column 3, line 7, "clasp belt" should be --clasp of the belt--
Column 4, line 23, omit, "," after 1
Column 4, line 44, omit "frame"
Column 4, line 47, "back portion" should be --back frame portion--.

Signed and Sealed this

Tenth Day of March, 1987

*Attest:*

DONALD J. QUIGG

*Attesting Officer*     *Commissioner of Patents and Trademarks*